United States Patent
Massari et al.

(10) Patent No.: US 11,080,022 B2
(45) Date of Patent: Aug. 3, 2021

(54) RANDOM NUMBER GENERATOR, IN PARTICULAR IMPROVED TRUE RANDOM NUMBER GENERATOR

(71) Applicant: TRENTINO SVILUPPO SPA, Rovereto (IT)

(72) Inventors: Nicola Massari, Pergine Valsugana (IT); Fabio Acerbi, Rovereto (IT); Giorgio Fontana, Trento (IT); David Stoppa, Trento (IT); Nicola Zorzi, Lavarone (IT); Lorenzo Pavesi, Trento (IT); Massimiliano Sala, Trento (IT); Alessio Meneghetti, Cittadella (IT); Leonardo Gasparini, Pergine Valsugana (IT); Zahra Bisadi, Povo di Trento (IT); Alessandro Tomasi, Trento (IT); Georg Pucker, Pergine Valsugana (IT); Claudio Piemonte, Povo di Trento (IT)

(73) Assignee: Trentino Sviluppo SPA, Rovereto (IT)

( * ) Notice: Subject to any disclaimer, the term of this patent is extended or adjusted under 35 U.S.C. 154(b) by 137 days.

(21) Appl. No.: 16/334,332

(22) PCT Filed: Oct. 20, 2017

(86) PCT No.: PCT/IB2017/056536
§ 371 (c)(1),
(2) Date: Mar. 18, 2019

(87) PCT Pub. No.: WO2018/073802
PCT Pub. Date: Apr. 26, 2018

(65) Prior Publication Data
US 2019/0205100 A1    Jul. 4, 2019

(30) Foreign Application Priority Data
Oct. 21, 2016   (IT) .................. 102016000106164

(51) Int. Cl.
*G06F 7/58* (2006.01)

(52) U.S. Cl.
CPC ..................................... *G06F 7/588* (2013.01)

(58) Field of Classification Search
CPC ....................... G06F 7/58–588; G04F 10/005
See application file for complete search history.

(56) References Cited

U.S. PATENT DOCUMENTS

| | | | |
|---|---|---|---|
| 8,259,293 B2 * | 9/2012 | Andreou | ........... H01L 27/14603 |
| | | | 356/222 |
| 10,146,508 B2 * | 12/2018 | Pavesi | ..................... G06F 7/588 |

(Continued)

FOREIGN PATENT DOCUMENTS

| | | |
|---|---|---|
| GB | 2 457 238 A | 8/2009 |
| WO | 2016/016741 A1 | 2/2016 |

OTHER PUBLICATIONS

Yan et al., "High-speed quantum-random number generation by continuous measurement of arrival time of photons" in Review of Scientific Instruments 86, 073113 (2015); https://doi.org/10.1063/1.4927320 (Year: 2015).*

(Continued)

*Primary Examiner* — Aimee Li
*Assistant Examiner* — Carlo Waje
(74) *Attorney, Agent, or Firm* — Workman Nydegger (57) ABSTRACT

A Random Number Generator includes a photon source, one or more photon detectors configured to detect at least one photon belonging to a flow of detected photons ($\lambda$) generated by the photon source, an electronic sampler operatively associated with the photon detectors and configured to implement a logic method for the extraction of a binary sequence based on the arrival time of each one of the detected photons ($\lambda$). In the Random Number Generator, the (Continued)

photon source and the photon detectors are adjacent to one another and integrated in a single semiconductor substrate.

7 Claims, 4 Drawing Sheets

(56) References Cited

U.S. PATENT DOCUMENTS

| | | | | |
|---|---|---|---|---|
| 2006/0010182 | A1* | 1/2006 | Altepeter | G06F 7/58 708/250 |
| 2008/0040410 | A1* | 2/2008 | Vartsky | B82Y 10/00 708/255 |
| 2008/0143766 | A1* | 6/2008 | Hawkins | B41J 2/03 347/11 |
| 2013/0214293 | A1* | 8/2013 | Duplessis | G02B 6/3552 257/84 |
| 2015/0261502 | A1* | 9/2015 | Sartor | G06F 7/588 359/107 |
| 2019/0205099 | A1* | 7/2019 | Herrmann | G06F 7/588 |

OTHER PUBLICATIONS

R. Xie et al., "High Optical Power Density Forward-Biased Silicon LEDs in Standard CMOS Process," in IEEE Photonics Technology Letters, vol. 27, No. 2, pp. 121-124, 15 Jan. 15, 2015, doi: 10.1109/LPT.2014.2362983. (Year: 2015).*

Nie et al., "Practical and fast quantum random number generation based on photon arrival time relative to external reference", in Appl. Phys. Lett. 104, 051110 (2014); https://doi.org/10.1063/1.4863224 (Year: 2014).*

Cova et al., "Avalanche photodiodes and quenching circuits for single-photon detection", in Applied Optics vol. 35, Issue 12, pp. 1956-1976 (1996); https://doi.org/10.1364/AO.35.001956 (Year: 1996).*

Bisadi et al., "Quantum random number generator based on silicon nanocrystals LED" Proceedings vol. 9520, Integrated Photonics: Materials, Devices, and Applications III; 952004 (2015) https://doi.org/10.1117/12.2179027 (Year: 2015).*

Bisadi et al. "A robust approach to the generation of high-quality random numbers" Proceedings vol. 9996, Quantum Information Science and Technology II; 99960P (2016) https://doi.org/10.1117/12.2242000 (Year: 2016).*

Z. Bisadi, G. Fontana, E. Moser, G. Pucker and L. Pavesi, "Robust Quantum Random Number Generation With Silicon Nanocrystals Light Source," in Journal of Lightwave Technology, vol. 35, No. 9, pp. 1588-1594, 1 May 1, 2017, doi: 10.1109/JLT.2017.2656866. (Year: 2017).*

Abbas Khanmohammadi et al., *A Monolithic Silicon Quantum Random Number Generator Based on Measurement of Photon Detection Time*, IEEE Photonics Journal, vol. 7, No. 5, Oct. 1, 2015, XP011586189, pp. 1-13.

M. Stipcevic et al., *Quantum Random Under Generator Based on Photonic Emission in Semiconductors*, Review of Scientific Instruments, AIP, vol. 78, No. 4, Jan. 1, 2007, XP002479718, pp. 045104-1-7.

Albert H. Titus et al., *CMOS Photodetectors*, Photodiodes—World Activities 2011, Jul. 29, 2011, XP055385575, pp. 37.

International Search Report and Written Opinion dated Feb. 5, 2018, issued in PCT Application No. PCT/IB2017/056536, filed Oct. 20, 2017.

* cited by examiner

RANDOM NUMBER GENERATOR, IN PARTICULAR IMPROVED TRUE RANDOM NUMBER GENERATOR

BACKGROUND OF THE INVENTION

1. The Field of the Invention

The present invention concerns a Random Number Generator (RNG), in particular a True Random Number Generator (TRNG) of the improved type.

2. The Relevant Technology

It is known that Random Number Generators are presently used in many applications, ranging from the scientific to the cryptographic field.

In the first case, a typical example is that of computational science, which requires the generation of a certain number of random initial states that serve as a description of the initial state of the simulation.

This type of applications generally requires that the initial configurations are not strictly correlated with one another but can be reproduced in a deterministic manner in order to make it possible to verify, for example, the effect of variations on the codes that perform the simulations. For this reason, said sequences are more correctly defined as Pseudo Random Numbers (PRN), because they are defined through complex algorithms which start from an initial value. In other words, given an initial random number, which in technical jargon is called "seed", a formula, no matter how complex, will always reproduce the same sequence of random numbers. The respective generators are called Pseudo Random Number Generators (PRNG).

On the contrary, in the second case, meaning when random numbers are used in cryptography techniques for the execution, for example, of bank operations, the approach described above appears to be weak, since it is necessary to ensure that the generated sequences are absolutely unpredictable, in order to be able to guarantee the safety of highly sensitive information. In this case, the safest approach involves the generation of random numbers obtained from a generation process that must really be a random process and must not allow the generated sequence to be predicted in any way. These generators, in fact, are known as True Random Number Generators (TRNG). In particular, quantum mechanisms such as, for example, the generation of photons by a light source, are among the most investigated methods for obtaining said sequences of true random numbers and are based on the indetermination of the measured event, which is among the properties of the quantum system itself.

From the point of view of the theory of information, the level of unpredictability of the random numbers generated through both of the above mentioned techniques can be expressed through the parameter defined as "entropy", which in fact is known as the quantity of uncertainty or information present in a random variable.

Furthermore, it is important to underline that with its NIST SP800-22 directive the National Institute of Standards and Technology (NIST) specifies approximately fifteen statistical tests that make it possible to establish whether a given Random Number Generator has a sufficient level of entropy or not.

As already mentioned, the use of PRNGs for purposes related to cryptography is dangerous, not only because certain algorithms present weaknesses that potentially become apparent only some time after their introduction, but also because if a ill-intentioned person should recover the seed from which all the random sequences are generated, he/she could predict all the subsequent outputs based on the same seed with absolute certainty.

A solution based on physical phenomena, and in particular on quantum phenomena, is therefore much more preferable, given the intrinsic unpredictability of these events, even by subjects who perfectly know the algorithms used and have a high calculation capacity at their disposal. However, while the algorithms for the generation of pseudo random numbers can be selected to create sequences having certain statistical properties that are determined with absolute certainty, in view, in fact, of their deterministic nature, the random numbers obtained starting from physical phenomena are subject to practical limitations due, for example, to variations in the instrument production quality, power supply fluctuations, environmental factors such as external fields and temperature variations. In general, these deviations from the ideal case determine a deviation from a uniform statistical distribution, which is independent of the events that can be measured in a sample space. Consequently, it is possible to observe a reduction even in the level of entropy of said True Random Number Generators.

In order to avoid this drawback, said True Random Number Generators need a further step, called post-processing, which is performed downstream of the extraction of the sequence of random codes, starting from the specific physical phenomenon. This post-processing step, in fact, makes it possible to improve the uniformity of distribution of probability of the random code sequence. However, to disadvantage, said post-processing step impacts the bit rate that the generator is capable of guaranteeing.

It is also known, as already mentioned above, that one of the physical phenomena which are most exploited for the generation of true random numbers is Quantum Photonics. For this reason, said generators, which belong to the macro category of TRNGs, are also indicated more specifically with the acronym QRNG (Quantum Random Number Generator). In these generators, in fact, an attenuated light source generates a few photons (low value of the detected photon flow k) which are acquired by one or more single photon detectors, each one of which is known under the acronym SPAD (Single Photon Avalanche Diode). Furthermore, the system includes apposite electronic circuitry located downstream of the above mentioned SPADs and consisting of auxiliary circuits and, usually, of one or more TDCs (Time to Digital Converter) or counters capable of extracting a random bit sequence from each one of said SPADs by measuring the arrival time of the acquired photons or counting them.

From the point of view of implementation, in these generators the light source and the detector or detectors are separate devices which need to be conveniently coupled and shielded. However, this implementation, to disadvantage, is obviously not immune to the influence of uncontrolled external environmental factors. Furthermore, the fact that the light source and the detector/s are separate devices which are successively coupled together makes the entire Random Number Generator highly vulnerable to any forcing or tampering action.

Furthermore, again to disadvantage, said implementation entails a high cost of the device, due to the need to optically align the two devices.

It is also known that the flow of photons generated by said generators obeys a Poisson process, meaning that the acquired events are independent of one another and that the probability to count n photons within an observation window $T_w$ follows the Poisson distribution:

$$P(x=n) = \frac{e^{-\lambda T_w}(\lambda T_w)^n}{n!}$$

where, in fact, λ indicates the detected photon flow.

The detected photon flow λ, the characteristics of the SPAD detectors and the bit extraction mode determine the final performance of the generator.

All the above having been explained, it should be noted that different types of Random Number Generators based on the QRNG concept are available on the market. These generators, in particular, cover a wide range of applications, from USB portable devices supplying just a few hundred kbit/sec to large electronic systems capable of guaranteeing a bit rate of hundreds of Mbit/sec. Furthermore, in the existing literature on this subject several logics and architectures have been proposed, which are configured for the determination of sequences of true random numbers starting from a physical phenomenon, in particular from photon detection. Most of these detect the "arrival time" or the number of photons incident on the sensitive surface of the SPAD detector or detectors.

In particular, regarding the technique based on the so-called arrival time, it has been proposed to measure the time which elapses from the moment when a photon comes into contact with a single SPAD and the moment when the successive photon comes into contact with the same SPAD. However, although this technique makes it possible to obtain a high bit rate, it presents a considerable bias due to the fact that, as already explained, the photon source obeys said Poisson process.

In order to overcome this drawback, the known art proposes that action be taken directly on the photon source, conveniently controlling the flow of photons generated by said source. This operation, in particular, includes the variation of the pilot current of the photon source, intended to make its statistical distribution over time as uniform as possible.

However, to disadvantage, this approach requires that specific electronic circuitry be introduced in the Random Number Generator, wherein said circuitry should be capable of piloting the photon source, as explained above, thus increasing the complexity and the size of the generator itself.

SUMMARY OF THE INVENTION

The present invention intends to overcome all the above mentioned drawbacks.

In particular, it is one object of the invention to provide a True Random Number Generator that makes it possible to guarantee a high level of entropy, in such a way as to at least pass the statistical tests defined by the NIST.

It is a further object of the invention to provide True Random Number Generator that makes it possible to obtain a high bit rate in the generation of random sequences of bits.

It is another object of the invention to provide a True Random Number Generator which has a more compact, more robust, less complex structure than the Random Number Generators known in the art.

Again, it is another object of the invention to provide a True Random Number Generator presenting a high level of safety against any attempt to force or tamper with its internal components.

It is another yet not the least object of the invention to provide a True Random Number Generator that is more economic compared to the generators of the known art.

The objects described above are achieved by the True Random Number Generator having the characteristics described in the main claim.

In particular, the True Random Number Generator that is the subject of the invention comprises a photon source with a flow of detected photons k, one or more photon detectors, preferably single photon detectors (SPAD), and electronic sampling means operatively associated with said one or more photon detectors in order to generate a bit sequence based on the number of photons detected in said photon detectors.

Said True Random Number Generator is characterized in that the photon source and the photon detector or detectors are placed side by side and are integrated in a single semiconductor substrate.

BRIEF DESCRIPTION OF THE DRAWINGS

The said objects, together with the advantages that are described below, are highlighted in the description of a preferred embodiment of the invention which is provided by way of non-limiting example with reference to the attached drawings, wherein.

Figures from 8 to 10 show time diagrams of the application of a second logic extraction algorithm implemented using the Random Number Generator of the invention.

DETAILED DESCRIPTION OF THE PREFERRED EMBODIMENTS

The Random Number Generator (RNG) that is the subject of the invention, in particular the True Random Number Generator (TRNG) of the invention, is schematically shown in Figures from 1 to 4, where it is indicated by 1.

As can be observed in the above mentioned drawings, the Random Number Generator 1 of the invention comprises a photon source 2 with a detected photon flow equal to λ.

Figure 4:
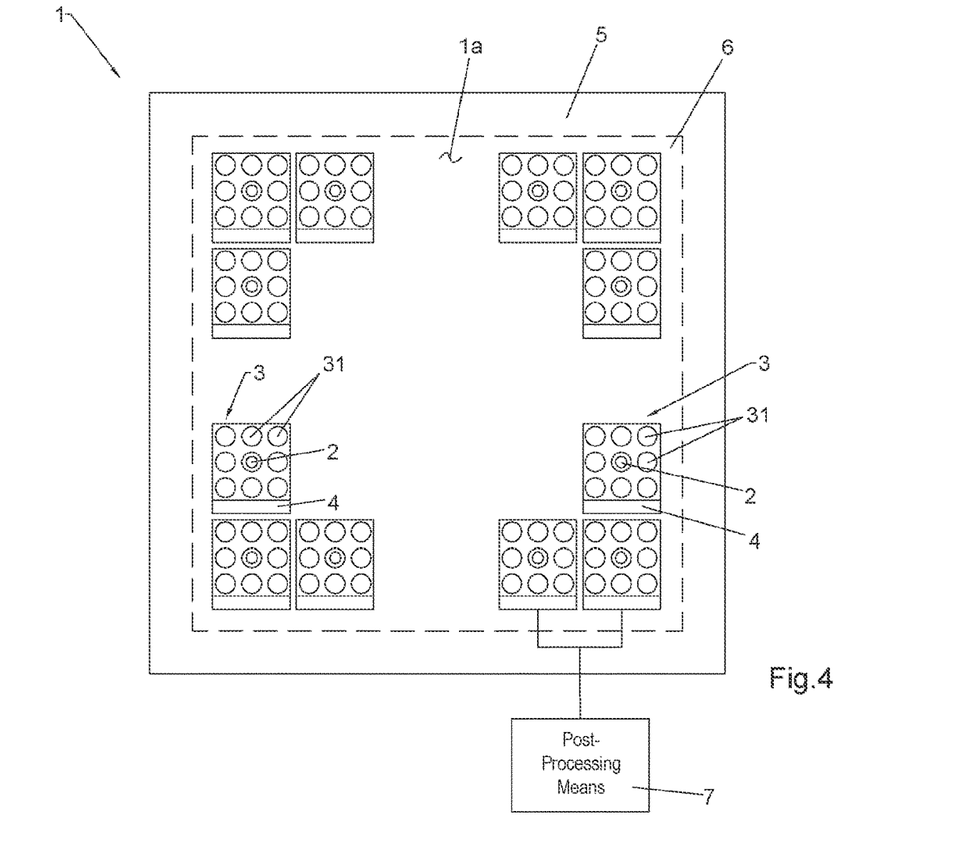
FIG. 4 shows a schematic view of a fourth embodiment, alternative to that shown in FIG. 1, of the Random Number Generator of the invention.

It cannot be excluded that, according to an alternative embodiment, for example that represented in FIG. 4, the generator 1 may include more than one photon source 2.

Figure 1:
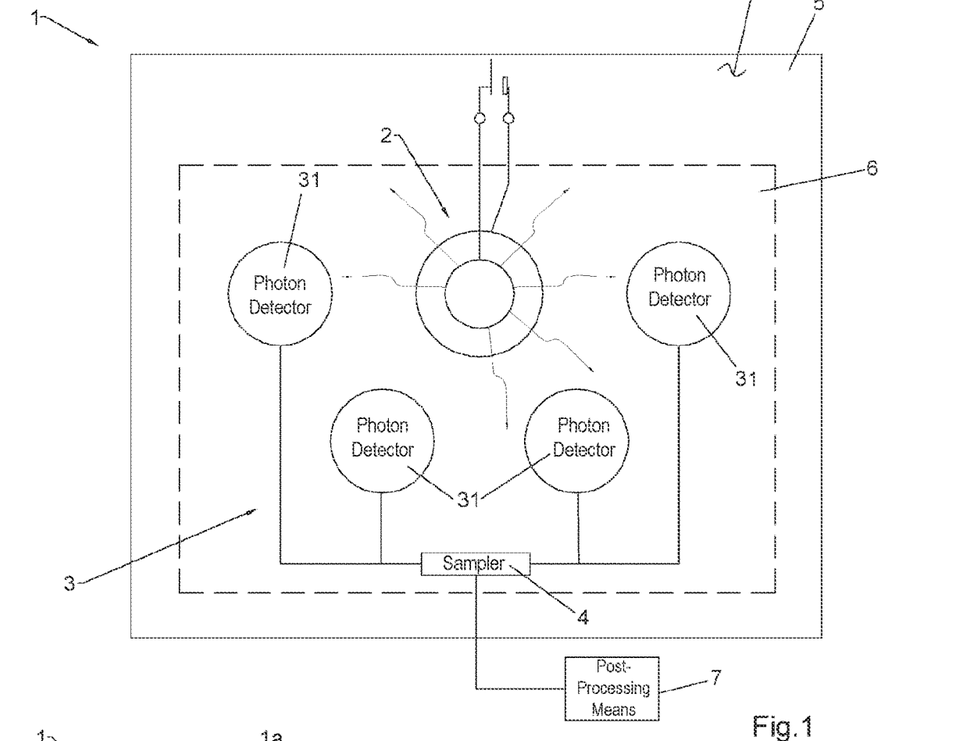
FIG. 1 shows a schematic view of a first embodiment of the Random Number Generator that is the subject of the invention.

According to the preferred embodiment of the invention, the Random Number Generator 1 furthermore comprises, as shown in FIG. 1, an array 3 of photon detectors 31.

Preferably but not necessarily, each one of said detectors is a single photon detector 31 commonly identified by the acronym SPAD.

In particular, as already mentioned above, a single SPAD detector 31 is capable of detecting and supply as an output the information related to the incidence of a single photon within its sensitive volume and possibly to the arrival time of the latter within an observation window having a pre-established duration.

Between two successive observation windows, each SPAD detector 31 undergoes a step of restoration of the initial conditions, called Dead Time in technical jargon, during which the same SPAD 31 is not capable of detecting any photon.

According to the preferred embodiment of the invention illustrated in FIG. 1, in the array 3 of photon detectors of the SPAD type each SPAD detector 31 works independently, in parallel with the other SPAD detectors 31, but the array 3 has a single common output for the reading of the signal generated by the same array 3 of SPADs 31 from the outside.

As is evident from FIG. 1, the advantage of having an array 3 of SPAD detectors 31 lies in that the solid angle of detection of the photons generated by the photon source 2 is extended and also lies in that any dead times are reduced, thus increasing the throughput of the generator itself.

Figure 2:
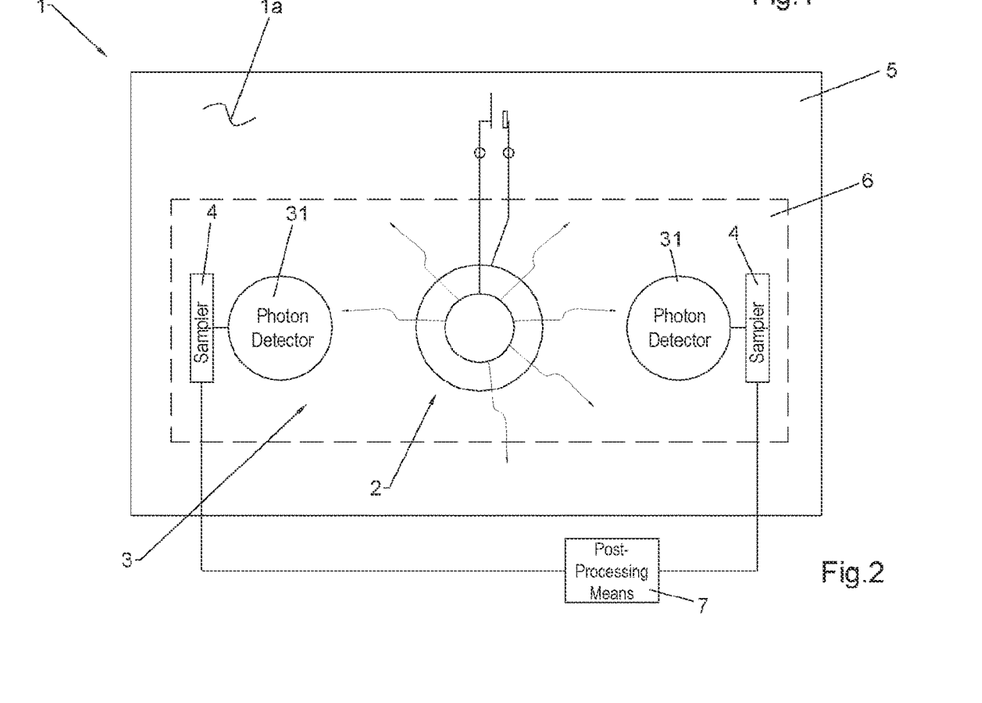
FIG. 2 shows a schematic view of a second embodiment, alternative to that shown in FIG. 1, of the Random Number Generator of the invention.

It cannot be excluded, however, that according to an alternative embodiment of the invention illustrated in FIG. 2 the Random Number Generator 1 may always include an array 3 of SPAD detectors 31, wherein, however, each SPAD detector 31 is independent of the other ones, meaning that it can generate towards the outside a signal that is independent of the signals generated by the other SPAD detectors 31. Furthermore, according to a different embodiment of the Random Number Generator 1 of the invention, not illustrated in the figures, said array 3 may be divided in subsets of SPAD detectors 31, each subset comprising a pre-established number of SPAD detectors 31 connected to one another in parallel in such a way as to generate a single signal towards the outside.

In the latter case, each one of said subsets of SPAD detectors 31 can interface with the outside independently of the other subsets.

This independence advantageously makes it possible to parallelize the extraction of the random binary sequences from the Random Number Generator 1, thus increasing the bit rate of the latter.

Figure 3:
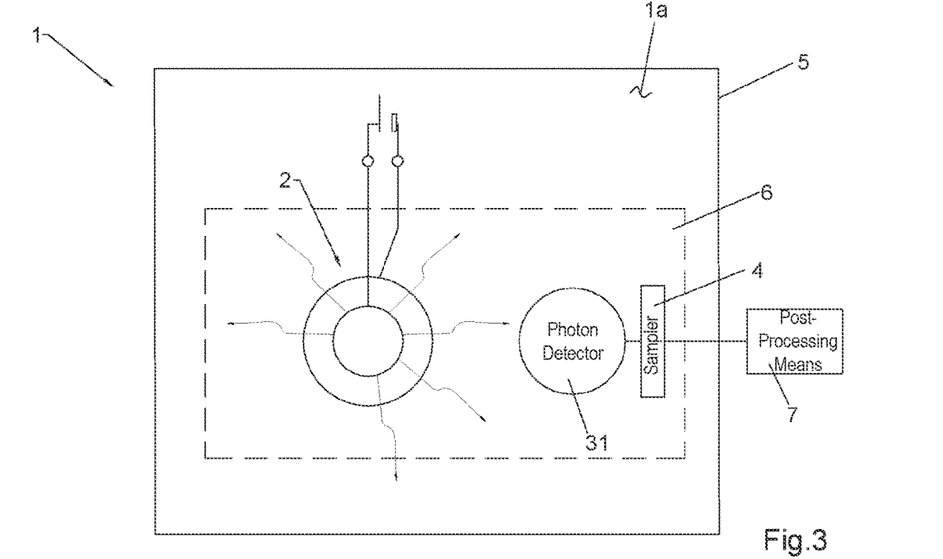
FIG. 3 shows a schematic view of a third embodiment, alternative to the first embodiment shown in FIG. 1 and to the second embodiment shown in FIG. 2, of the Random Number Generator of the invention.

Furthermore, according to a different embodiment illustrated in FIG. 3, the Random Number Generator 1 of the invention may include just one SPAD detector 31.

Again, a fourth embodiment of the Random Number Generator 1 that is the subject of the invention may include, as already mentioned, a plurality of photon sources 2, each associated with an array 3 of photon detectors 31, as shown in FIG. 4. In other words, if the combination of a photon source 2 with one or more photon detectors 31 is defined as pixel, said fourth embodiment of the Random Number Generator 1 of the invention may be seen as a pixel matrix that makes it possible to parallelize the operation of extraction of random numbers.

As regards the photon source 2, according to the preferred embodiment it also comprises at least one SPAD. In this case, both the array 3 of SPAD detectors 31, which serve as receivers, and the photon source 2 comprising at least said SPAD are configured and polarized in such a way as to work in the so-called Geiger mode with the same polarization voltage.

As already mentioned above and as schematically shown in Figures from 1 to 4, the Random Number Generator 1 of the invention comprises also electronic sampling means 4, which in the case of the preferred embodiment of FIG. 1 are operatively connected to said common output for the reading of the signal generated by the array 3 of SPAD detectors 31.

As regards, instead, the embodiment shown in FIG. 2, electronic sampling means 4 are provided for each SPAD detector 31 belonging to the array 3, while in the third embodiment shown in FIG. 3 there are single electronic sampling means 4 for the single SPAD detector 31, and finally in the fourth embodiment represented in FIG. 4 electronic sampling means 4 are provided for each pixel.

In any case, said electronic sampling means 4 are configured to implement a predefined logic method or algorithm for the extraction of a binary sequence based on the arrival times of said photons at the level of the respective SPAD detectors 31. Some preferred examples of said logic extraction method are described in detail here below.

According to the invention, in the Random Number Generator 1 said photon source 2 and the array 3 of SPAD detectors 31 or the single SPAD detector 31 are carried out side by side and integrated in a single semiconductor substrate 5.

This makes the detected photon flow $\lambda$ generated by the photon source 2 flow towards the array 3 of SPAD detectors 31 positioned beside it through the semiconductor material with which said components have been made (a phenomenon known as "optical crosstalk"), differently from what happens in the Random Number Generators of the known art, in which the same photons flow through the intermediate empty coupling space between said two components, which are physically distinct from each other.

Advantageously, said integrated configuration makes the Random Number Generator 1 of the invention more compact and structurally less complex than the generators of the known type.

Furthermore, thanks to the integration of all the components of the Random Number Generator 1, the latter is more robust and immune to external environmental influences and to any forcing or tampering attempt made by ill-intentioned persons.

This integrated configuration and therefore this direct coupling between the photon source 2 and the SPAD detector or detectors 31 are advantageous with respect to the solutions where beam splitters are used, as they obtain a uniform illumination of the SPAD detectors 31 with no need to make sure that the splitter is constantly in a perfectly aligned condition.

According to the preferred embodiment of the invention, the photon source 2 and the array 3 of SPAD detectors 31 are made on said semiconductor substrate 5 through the same fabrication steps, in such a way as to define said elements with the same chemical-physical structure in terms of doping profiles. Even more precisely, as mentioned above, even the photon source 2 may be fabricated with the same chemical-physical structure as a SPAD completely identical to the SPADs 31 belonging to said array 3.

Advantageously, this makes it possible to drastically reduce the production costs of the various components that make up the Random Number Generator 1 of the invention, since it is possible to obtain one or more photon sources 2 and/or one or more SPAD detectors 31 on the same semiconductor substrate 5 with no need to vary, in particular with no need to increase, the number of fabrication steps.

As regards the semiconductor substrate 5, according to the preferred embodiment of the invention it is a silicon substrate 51.

However, it cannot be excluded that in different embodiments of the invention, in order to increase the efficiency of the emitter-source coupling, said semiconductor substrate 5 may be made with a semiconductor material different from silicon.

As regards the array 3 of SPAD detectors 31, it is known that each one of them is obtained mainly through a conveniently doped p-n junction, in such a way as to allow the occurrence of the phenomenon known as "avalanche generation" in technical jargon when the same SPAD detector 31, conveniently polarized, is subjected to the impact of a photon within its sensitive volume.

As, according to the preferred embodiment of the invention, the photon source regards the photon source 2, it is defined through a conveniently doped p-n junction, too, in such a way as to generate the detected photon flow λ when said source 2 is conveniently forward biased or reverse biased.

In particular, according to the preferred embodiment of the invention, the photon source 2 is configured in such a way as to obtain an emission spectrum of the detected photon flow λ mainly included between 800 nm and 1000 nm. In this spectrum, the efficiency of each SPAD detector 31 can be considered to be not excessively high, less than 10%. Therefore, it is estimated that in order to obtain, for example, a detection rate of approximately 500,000 counts/sec, a useful photon rate (flow of photons that reaches the sensitive volume of the SPAD detector or detectors 31 from the photon source 2) higher than 5,000,000 ph/sec is needed.

Thus, going back to the fabrication of the Random Number Generator 1, the fact that the structures of the photon source 2 and of the SPAD detectors 31 have both a p-n junction as their main feature confirms the advantage described above, meaning the possibility to carry out the same fabrication steps to make said photon source 2 and the SPAD detectors 31.

Preferably but not necessarily 2 and the SPAD detectors 31, obtained through the same fabrication steps, have the same chemical-physical structure.

However, it cannot be excluded that in different embodiments of the Random Number Generator 1 of the invention, the photon source 2 and the SPAD detectors 31 can be made with different chemical-physical structures, in particular with different sizes and/or different doping levels, even if they are obtained through the same fabrication steps.

As regards the technique used to integrate said components in the semiconductor substrate 5, according to the preferred embodiment of the invention, it is the CMOS or CMOS-compatible technique of microfabrication of integrated circuits.

The advantage of using said CMOS microfabrication technique lies in that it is possible to integrate in the semiconductor substrate 5 also said sampling means 4 of the output signals of the array 3 of SPAD detectors 31.

Figure 5:
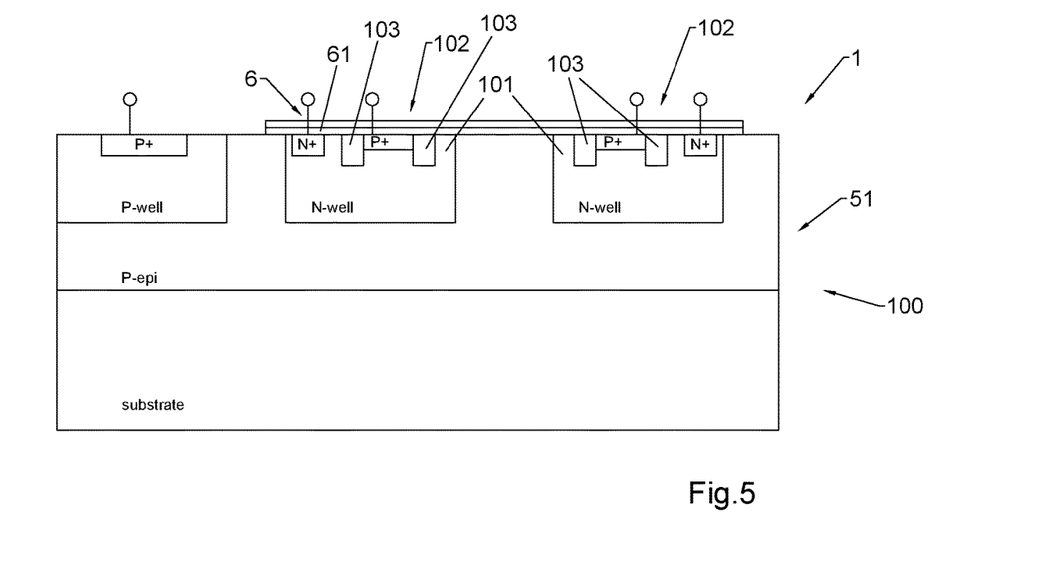
FIG. 5 shows a sectional view of an example of embodiment of the Random Number Generator of the invention made according to a CMOS microfabrication technique.

An example of a possible Random Number Generator 1 of the invention obtained through said CMOS microfabrication technique is schematically represented in a sectional view in FIG. 5. Said Random Number Generator 1, in greater detail, uses a doped substrate/epitaxial structure of type p 100, in which a deep-n-well 101 is created and the junctions are made which define the photon source 2 and the SPAD detectors 31 with an implant of type p+ 102. Furthermore, in order to avoid electrical fields that are higher at the edges of the sensitive area than at the centre of the same, structures of "guard rings" 103 are preferably provided, creating a ring with p-well around the p+ implant 102.

It cannot be excluded, however, that in different embodiments of the invention the technique used to fabricate the photon source 2 and the SPAD detectors 31 may be a technique of the custom type. The advantage offered by this last solution lies in that the fabrication steps of the Random Number Generator 1 of the invention can be optimized in order to obtain the photon source 2 and the SPAD detectors 31.

According to an example of implementation of a Random Number Generator with a custom fabrication technique, the SPAD detectors 31 and the photon source 2 may be integrated in a doped epitaxial structure/substrate of type p, wherein a so-called "shallow" implant and an enhancement implant are defined in the epitaxial structure, said "shallow" implant being more superficial, of type n+ and concentric with the epitaxial structure, but with more reduced extension, and said enhancement implant being of type p– and having reduced doping but in any case higher doping than that of the epitaxial structure.

In this way, a so-called structure with "virtual guard ring" is created. In order to avoid problems related to "charge crosstalk" or "charge injection", caused by the common epitaxial structure shared by the two implants, it is possible either to separate the photon source and the photon detector or detectors, placing them at suitable distances, or to create deep trenches which surround both the area defining the photon source and the area defining the detector or detectors. Finally, a further option is the possibility to create an auxiliary junction which, when conveniently biased, collects the excess charge which may be transferred from the photon source to the detector or detectors. The creation of trenches would also reduce the optical crosstalk, which instead is a desired characteristic. However, this reduction does not exceed a percentage in the order of 30-50%, therefore it is acceptable if it brings about the benefit of completely eliminating said problem.

As already explained above, the Random Number Generator 1 of the invention is configured so as to alternatively allow the photon source 2 to be forward-biased or reverse-biased in order to generate the detected photon flow k.

In the case of reverse bias, photoluminescence is exploited during phenomena of avalanche generation, which occurs in a controlled manner, but according to random intervals.

In the case of forward bias, the produced photons behave in a manner that is very similar to the case of reverse bias and the generation efficiencies (photons per transited electrical charge) are relatively similar or higher, but forward bias can reduce the dissipated power compared to reverse bias, given the lower voltage applied.

To indicate an order of magnitude, in fact, a forward biased photon source 2 needs a voltage of a few Volts, while a reverse biased photon source needs a voltage of several dozens of Volts.

Therefore, a forward biased photon source 2 would advantageously make it possible also to reduce the space necessary to electrically insulate the photon source 2 itself from the array 3 of SPAD detectors 31. Consequently, still to advantage, said forward biased photon source 2 makes it possible to obtain a more compact design of the Random Number Generator 1 and a lower cost of the same due to the lower quantity of silicon used to make the generator itself.

However, since the structure and the fabrication technique of the photon source 2 and the SPAD detectors 31 are similar or even identical, the advantage offered by reverse bias lies in that the same voltage can be used to bias both of the components.

In particular, this last solution makes it possible to reduce the complexity and the overall dimensions of both the structure and the external circuitry: the photon source 2 and the SPAD detectors 31, in fact, can share the same implant, having a terminal in common, and consequently they can be moved near each other, thus reducing the occupied space while at the same time improving their optical coupling.

In any case, the scarce efficiency of the photoluminescence process in the generation of few photons is in favour of "quantum detection", as the SPAD detector or detectors 31 is/are sensitive, by definition, to the single photon.

As already mentioned above, according to the preferred embodiment of the invention also the electronic sampling means 4 are integrated in the semiconductor substrate 5 together with the photon source 2 and the array 3 of SPAD detectors 31.

In this case, in addition to being configured to read the signal or signals generated by the array 3 of SPAD detectors 31, said electronic sampling means 4 may advantageously be configured to directly and readily control the operating conditions of the photon source 2 and correct any bias parameters, or to enable or exclude emitters in order to obtain the desired photon flow or the desired bit rate.

Furthermore, according to the preferred embodiment of the invention, at the level of its upper surface 1a the Random Number Generator 1 is covered with a light inhibitor filter 6. In particular, preferably but not necessarily, said light inhibitor filter 6 includes a metallization layer 61 that can be made directly during the production process, for example through the CMOS technique, as last metallization level. This solution has the function of shielding the SPAD detector or detectors 31 from the external light and therefore of making them sensitive only to the photons which transit from the photon source 2 through the semiconductor substrate 5 due to the crosstalk phenomenon. Furthermore, the metallization layer 61 has also the function of improving the coupling of the photons emitted by the semiconductor substrate, in particular the silicon substrate, reflecting the radiation generated by the same photon source 2 towards the inside and thus preventing its exit from the silicon substrate. This further results in the improved optical coupling between the photon source 2 and the array 3 of SPADs 31.

Furthermore, advantageously, the metallic covering has also the function of protecting the Random Number Generator 1 from any tempering attempt by ill-intentioned persons with the functionality of the system.

Consequently, the presence of said metallization makes it possible to guarantee higher safety and reliability of the random numbers generated by said generator 1 of the invention.

Finally, optionally, the Random Number Generator 1 of the invention may comprise also electronic post-processing means 7 configured to receive as an input the binary sequences extracted by said electronic sampling means 4, which in turn are associated with the array 3 of SPAD detectors 31.

Said electronic post-processing means 7 are configured to process said binary sequences in such a way as to carry out a so-called "whitening" operation.

This last word indicates a plurality of compression operations intended to improve the statistical properties of the binary sequences produced. Consequently, advantageously, said further post-processing step makes it possible to increase the level of entropy of the Random Number Generator 1 of the invention.

As already mentioned above, the sampling means 4, which according to the preferred embodiment are connected to the array 3 of SPAD detectors 31, or alternatively to a subset of said SPAD detectors 31, or to just one SPAD detector 31, or even to a single pixel, are configured in such a way as to implement a logic extraction method intended to extract a binary sequence based on the number of photons detected in said array 3 of SPAD detectors 31, in the subset, in said just one SPAD detector 31, or even in the single pixel.

According to the invention, a first logic extraction method implemented through said sampling means 4 of the Random Number Generator 1 of the invention includes the subdivision of the observation window of each SPAD detector 31 into a plurality of consecutive observation sub-windows Tw having the same duration, as well as a comparison of the arrival times of detected photons within said consecutive observation sub-windows Tw. Said observation sub-windows Tw are generated starting from a reference clock, indicated by CLK in the diagram of FIG. 6, whose duty cycle defines the time when the SPAD detector 31 is at the level of the dead time (CLK=H).

Figure 6:
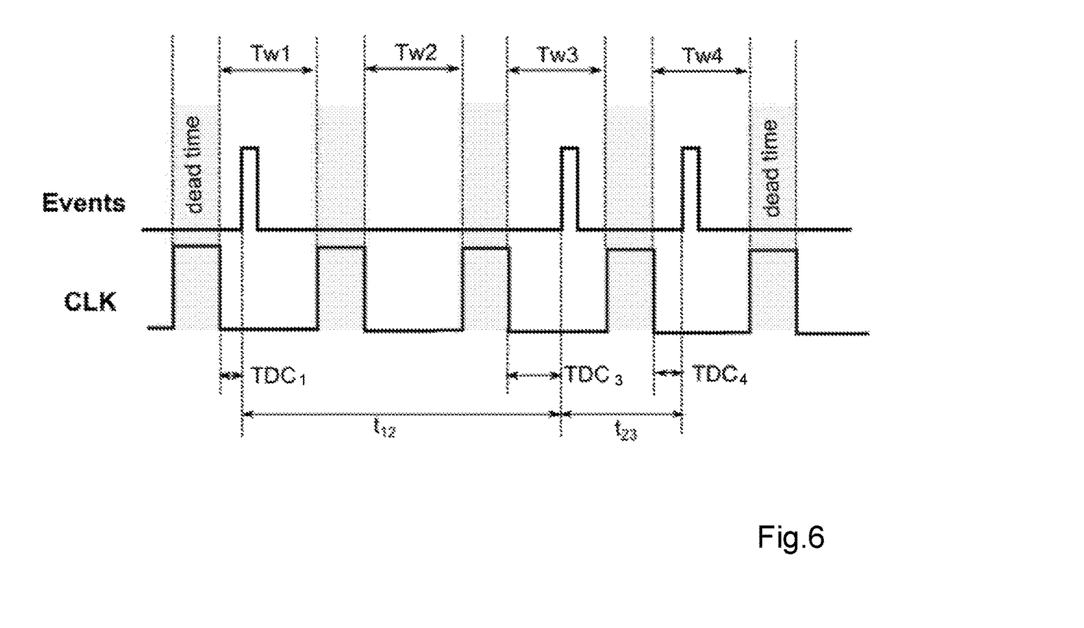
FIG. 6 shows a time diagram of the application of a first logic extraction algorithm implemented using the Random Number Generator of the invention.

In particular, the logic extraction method proposed herein includes, at the level of each sub-window Tw, the measurement of the arrival time of a first photon by means of a Time to Digital Converter (TDC) or alternatively through an analog instrument called Time to Analog Converter (TAC). The diagram shown in FIG. 6 represents the detection of photons TDC1, TDC3 and TDC4, respectively at the level of the observation sub-windows Tw1, Tw3 and Tw4. For each pair of adjacent observation sub-windows, which in the example of FIG. 6 are the pairs of windows Tw1-Tw2 and Tw3-Tw4, the arrival times detected for the respective photons are compared. In general, in the bit extraction process carried out through the logic extraction method of the invention, bit "1" is assigned when the arrival time detected for the first sub-window of the pair is higher than the arrival time detected for the second sub-window and bit "0" is assigned in the opposite case.

The logic extraction method furthermore includes three limit cases, which are described here below.

In the first limit case, no photon is detected in either of the two observation sub-windows of a pair. In this case, no bit is assigned.

In the second case, the arrival times of the two photons detected at the level of the two adjacent observation sub-windows perfectly correspond to each other. According to the logic extraction method of the invention, in this case, either, no bit is assigned.

In the third case envisaged by the logic extraction method of the invention, no photon is detected in one of the two observation sub-windows of a pair, while in the other observation sub-window a photon is detected with a specific arrival time.

According to the invention, the logic extraction method takes in consideration an arrival time also for the sub-window in which no photon has actually been detected and this arrival time is considered longer than the total duration of the observation sub-window. This advantageously makes it possible to assign a bit also in said third limit case, according to the logic described above.

For example, in the case represented in FIG. 6, as regards the first pair of sub-windows Tw1-Tw2, the logic extraction method of the invention assigns a bit equal to 0, given that TDC1<Tw2 (TDC2), while as regards the second pair Tw3-

Tw4, the logic extraction method assigns a bit equal to 1, given that TDC3>TDC4. Comparing said logic extraction method of the invention with the measurement of the inter-arrival times, indicated by t12 and t23 in FIG. 6, which is known in the art, it can be observed that in the second case in order to generate a bit at least two photons per each pair must have been detected, while in the same conditions the logic extraction method of the invention can generate a maximum number of bits equal to 2, that is, equal to the number of photons detected. This means that, considering an even number N of observation sub-windows, the logic extraction method proposed by the invention is advantageously capable of extracting a maximum number of N/2 bits.

Figure 7:
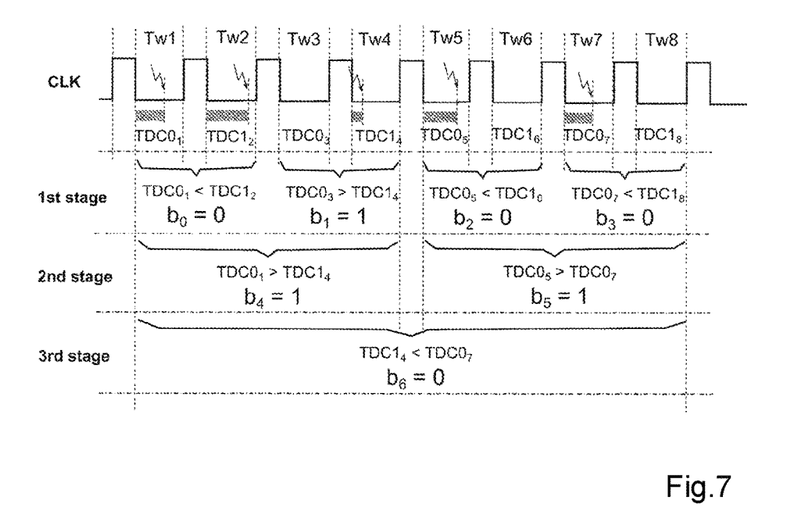
FIG. 7 shows a time diagram of the application of the logic extraction algorithm of FIG. 6 including some further optional steps compared to those represented in FIG. 6.

Optionally, according to the logic extraction method of the invention, the number of bits extracted can be extended by comparing the arrival times resulting from said first comparison with pairs of adjacent sub-windows. In fact, as can be observed in the example of FIG. 7, the successive comparisons must be made starting from the shortest arrival times TDC01 and TDC14, on the one side, and TDC05 and TDC07, on the other side, (or alternatively the longest arrival times) identified in the previous comparison stage (1st stage). In this case, considering an even number N of observation sub-windows, the logic extraction method of the invention is capable of extracting a maximum number of N−1 bits.

A minimization of the time sub-window Tw will allow a potential increase of the bit rate, compatibly with the incident photon flow.

Among the other things, it is important to highlight that the solution offered by the logic extraction method just described above may be claimed per se, with no need to implement said logic extraction method in a Random Number Generator 1 made according to the preferred embodiment of the invention or according to the alternative embodiments just described above. In fact, said last solution alone makes it possible to increase the efficiency of the generator on which it could be implemented in order to increase the final bit rate while at the same time guaranteeing good immunity to possible variations of external parameters such as the photon flow and the temperature.

Alternatively, a second logic extraction method which is part of the invention and can be implemented in the sampling means 4 of the Random Number Generator 1 is proposed here below. Said second logic extraction method, in particular, is based on the measurement of the arrival time of the single photon, which takes in consideration the intrinsic defects of SPAD detectors.

Said logic extraction method, in fact, is simple and easy to implement, robust, capable of generating high-quality random numbers and suited to be applied to a Random Number Generator completely integrated in a semiconductor substrate.

This logic extraction method mainly has the object to cope with the variations in the emission of the photon flow generated by the photon source. For this purpose, the logic extraction method essentially includes, as its main feature, the subdivision of the observation time window of the single photon for each one of the photon detectors 31 into a structure with time intervals and sub-intervals.

Preferably, each observation window is subdivided into a plurality of intervals I, each one of which is in turn divided into N sub-intervals sS having the same duration, with N>2. Each one of the sub-intervals sS is associated with a symbol, in order to generate a random number in the case where a single photon is detected at the level of one and only one of said time sub-intervals. It should be noted that each one of said symbols associated with one of said sub-intervals sS is univocal and distinct from the symbols associated with the remaining sub-intervals sS.

Figure 8:
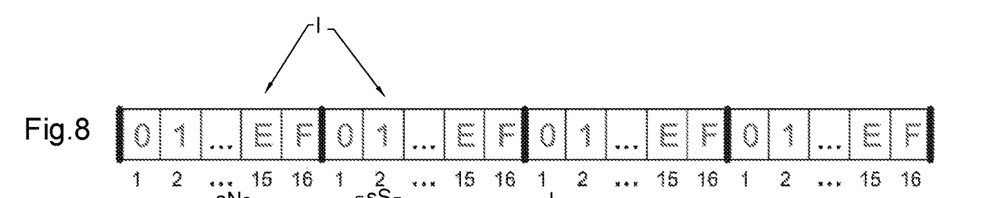

In the preferred embodiment, as schematically represented in FIG. 8, the number N of sub-intervals sS is equal to 16 and in this case the symbols used correspond to the sixteen hexadecimal digits (0, 1, 2, 3 . . . D, E, F).

It cannot be excluded, however, that the number N of sub-intervals sS associated with a symbol may be different from 16, provided that each one of them is associated with a univocal symbol, distinct from those associated with the other sub-intervals.

Since, as already mentioned above, the SPAD detectors made in the semiconductor substrate actually present some non-idealities, the logic extraction method of the invention adds further characteristics to the concept of subdividing each interval I in sub-intervals sS illustrated above, in order to minimize the effects of said non-idealities.

In greater detail, said non-idealities comprise phenomena which are well known in the sector of SPAD detectors, such as afterpulsing, dead time, jitter and dark counts.

All of these undesired phenomena strongly depend on temperature, component ageing, bias voltage, etc.

In particular, the phenomenon of afterpulsing can strongly influence the photon source so that it will not obey a Poisson process which, instead, it should normally follow.

It should be premised that the characteristics of the logic extraction method introduced here below have the purpose of improving some aspects of the detection process, which are inevitably subject to non-idealities as regards both the detector or detectors and the sampling means. Regarding said further characteristics of the logic extraction method of the invention in addition to the subdivision represented in FIG. 8, first of all they include the subdivision of said time interval I into at least 2N sub-intervals, wherein the first N sub-intervals are the sub-intervals sS associated with a symbol, while the remaining second N sub-intervals sN1 are not associated with any symbol, meaning that they cannot generate a random number in the case where a photon impacts the detector exactly during the latter sub-intervals sN1. In particular, as can be observed in the representation of the interval I shown in FIG. 9, which is more complex compared to that shown in FIG. 8, each sub-interval sN1 is temporally interposed between two consecutive sub-intervals sS.

According to the preferred embodiment of the invention, as shown in FIG. 8, the logic extraction method includes the subdivision of said time interval I into 32 sub-intervals, wherein 16 sub-intervals sS are associated with a symbol, while the remaining 16 sub-intervals sN1 are not associated with any symbol.

This characteristic leads to the technical result of mitigating the effects of dead time between sub-intervals of the detector and the effects of the electronic jitter in general.

Furthermore, according to the logic extraction method of the invention, each interval I comprises further M sub-intervals sN2, with M>2 and preferably M=2N, arranged consecutively and defined before (or alternatively after) said 2N sub-intervals sN1 and sS described above. Said further M sub-intervals sN2 are not associated with any symbol, either, and therefore, also in this case, if a photon impacts the detector during said further sub-intervals sN2, no random number is generated.

Figure 9:
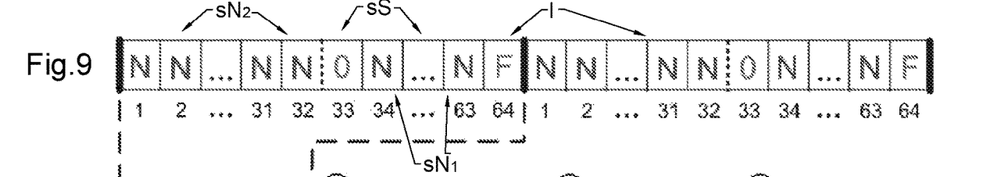

Preferably, as shown always in FIG. 9, according to the logic extraction method of the invention each interval I comprises further 32 sub-intervals sN2 arranged consecutively and defined before (or alternatively after) said 32 sub-intervals sN1 and sS described above. This further characteristic leads to the technical result of masking the effects of the afterpulsing and of the dead time between the intervals I.

Figure 10:
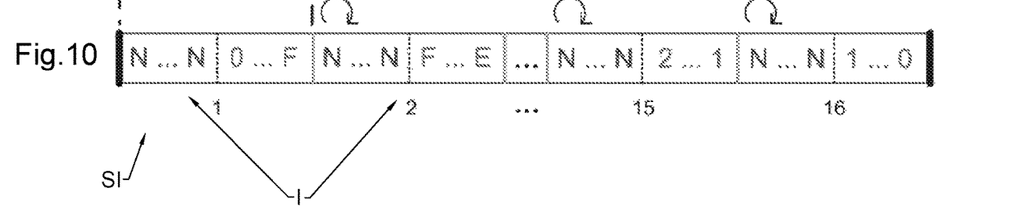

Again, a further characteristic of the logic extraction method of the invention is the definition of a super-interval SI, whose duration preferably corresponds to the duration of the observation window of each photon detector and which in turn comprises 16 consecutive intervals I, each one of which provided with said 64 sub-intervals sN1, sN2 and sS, as shown in FIG. 10. In particular, according to the logic extraction method between two consecutive intervals I the sub-intervals sS associated with a symbol are cyclically staggered by one position, as schematically represented always in FIG. 10. For example, the first interval I from the left in FIG. 10 presents the sub-intervals sS ordered from 0 to F, while the immediately adjacent interval I presents the sub-intervals sS ordered from F to E and so on for the successive intervals I.

This characteristic advantageously makes it possible to obtain the technical result of redistributing the jitter due to the counter and to the logic circuit to all the symbols. It cannot be excluded that, according to an alternative embodiment of the logic extraction method just described above, the number of intervals I belonging to said super-interval SI may be different from 16.

Among the other things, it should be noted that the solution of the logic extraction method proposed may be claimed per se, with no need to implement said logic extraction method in a Random Number Generator 1 according to the preferred embodiment of the invention or to the alternative embodiments described above. In fact, said last solution alone makes it possible to increase the efficiency of the generator on which it is implemented, in order to increase the final bit rate and at the same time guarantee good immunity to possible variations of external parameters such as the photon flow and the temperature.

According to the above, therefore, the Random Number Generator of the invention achieves all of the set objects.

In particular, the invention achieves the object to provide a Random Number Generator which makes it possible to guarantee a high level of entropy, in such a way as to at least pass the statistical tests defined by the NIST.

The invention furthermore achieves the object to provide a Random Number Generator which makes it possible to obtain a high bit rate in the generation of random sequences of bits.

The invention also achieves the object to provide a Random Number Generator which has a more compact, more robust, less complex structure compared to the Random Number Generators of the known art.

Again, the invention also achieves the object to provide a Random Number Generator with a high level of safety against any attempt to force and tamper with its internal components.

Finally, the invention also achieves the object to provide a Random Number Generator which is more economic than the generators of the known art.

The invention claimed is:

1. A Random Number Generator of the type comprising:
a photon source;
one or more photon detectors configured to detect at least one photon belonging to a flow of detected photons ($\lambda$) generated by said photon source and detected by said one or more photon detectors, said photon source and said one or more photon detectors are arranged so that said photon source and said one or more photon detectors are adjacent to each other and integrated in a single semiconductor substrate;
electronic sampling means operatively associated with said one or more photon detectors and configured to extract a binary sequence based on an arrival time of each one of said detected photons ($\lambda$) by causing said electronic sampling means to perform the following steps:
subdivide an observation window of each one of said one or more photon detectors into a plurality of consecutive observation sub-windows having the same duration;
detecting the arrival times of a first photon in each one of said observation sub-windows;
in a case where no photon has been detected by said one or more photon detectors during one or more of said observation sub-windows, considering as arrival time of said photon in said one or more observation sub-windows a time that is longer than a total duration of said one or more observation sub-windows;
comparing in a first comparing step the arrival times of pairs of the observation sub windows to determine a pair of shortest arrival times;
assigning in the first comparing step a bit "1" in a case where the arrival time detected for a first observation sub-window of a pair exceeds the arrival time detected for a second observation sub-window, or assigning a bit "0" in a case where the arrival time detected for the second observation sub-window of the pair exceeds the arrival time detected for the first observation sub-window;
comparing in a second comparing step the pair of shortest arrival times with the arrival times of other possible pairs of the observation sub-windows until a last pair of sub-windows has been compared; and
assigning in the second comparing step the bit "1" in a case where the arrival time detected for a first observation sub-window of a pair exceeds the arrival time detected for a second observation sub-window, or assigning the bit "0" in a case where the arrival time detected for the second observation sub-window of the pair exceeds the arrival time detected for the first observation sub-window.

2. The Random Number Generator according to claim 1, wherein said photon source and said one or more photon detectors are made on said single semiconductor substrate through the same fabrication steps, in such a way as to define said photon source and said one or more photon detectors with the same chemical-physical structure in terms of doping profiles.

3. The Random Number Generator according to claim 1, wherein said single semiconductor substrate is a silicon substrate.

4. The Random Number Generator according to claim 1, wherein each one of said one or more photon detectors is a photon detector of a single photon avalanche diode (SPAD) type, configured to operate in a Geiger mode.

5. The Random Number Generator according to claim 1, wherein said photon source and said one or more photon detectors are made in said single semiconductor substrate through a CMOS technique of microfabrication of integrated circuits.

6. The Random Number Generator according to claim 1, wherein said electronic sampling means is integrated in said single semiconductor substrate together with said photon source and with said one or more photon detectors.

7. A Random Number Generator of the type comprising:
a photon source;
one or more photon detectors configured to detect at least one photon belonging to a flow of detected photons ($\lambda$) generated by said photon source and detected by said one or more photon detectors, said photon source and said one or more photon detectors are arranged so that said photon source and said one or more photon detectors are adjacent to each other and integrated in a single semiconductor substrate;
electronic sampling means operatively associated with said one or more photon detectors and configured to extract a binary sequence based on an arrival time of each one of said detected photons ($\lambda$) by causing said electronic sampling means to perform the following steps:
subdividing an observation window of each one of said one or more photon detectors into a plurality of intervals;
subdividing each one of said plurality of intervals into M+2N sub-intervals, with N and M>2;
assigning a symbol to each one of a first N sub-intervals, said symbol being univocal and distinct from symbols associated with remaining of said first N sub-intervals;
defining second N sub-intervals in such a way that each one of said second N sub-intervals is temporally interposed between two of said first N sub-intervals that are consecutive, said second N sub-intervals not being associated with any symbol;
defining M sub-intervals before or after said first N sub-intervals and said second N sub-intervals, said M sub-intervals not being associated with any symbol;
for each pair of said plurality of intervals that are consecutive, cyclically displacing by one position said symbols associated with said first N sub-intervals of a first one of said pair of said plurality of intervals with respect to the symbols associated with said first N sub-intervals of the second one of said pair of said plurality of intervals;
during said observation window, determining in which one of said first N sub-intervals associated with a symbol and belonging to one of said plurality of intervals a photon is detected;
generating said binary sequence based on the symbol associated with said first sub-intervals in which said photon has been detected.

* * * * *